US012076885B2

(12) United States Patent
Ding

(10) Patent No.: US 12,076,885 B2
(45) Date of Patent: Sep. 3, 2024

(54) REPAIR PROCESS USING NETWORKED CERAMIC NANOFIBERS

(71) Applicant: Raytheon Technologies Corporation, Farmington, CT (US)

(72) Inventor: Zhongfen Ding, South Windsor, CT (US)

(73) Assignee: RTX CORPORATION, Farmington, CT (US)

( * ) Notice: Subject to any disclaimer, the term of this patent is extended or adjusted under 35 U.S.C. 154(b) by 876 days.

(21) Appl. No.: 17/174,842

(22) Filed: Feb. 12, 2021

(65) Prior Publication Data

US 2021/0162624 A1 Jun. 3, 2021

Related U.S. Application Data

(62) Division of application No. 16/270,660, filed on Feb. 8, 2019, now Pat. No. 10,919,180.

(51) Int. Cl.
| | |
|---|---|
| *B32B 11/08* | (2006.01) |
| *B28B 1/34* | (2006.01) |
| *B28B 11/08* | (2006.01) |
| *C23C 4/11* | (2016.01) |
| *C23C 28/04* | (2006.01) |
| *F01D 5/28* | (2006.01) |

(52) U.S. Cl.
CPC ............ *B28B 1/34* (2013.01); *B28B 11/0845* (2013.01); *C23C 4/11* (2016.01); *C23C 28/042* (2013.01); *F01D 5/288* (2013.01); *F05D 2300/20* (2013.01); *F05D 2300/614* (2013.01)

(58) Field of Classification Search
CPC .... C23C 4/10; C23C 4/11; C23C 4/18; C23C 28/042; F01D 5/005; F01D 5/284; F01D 5/288; F05D 2300/20; F05D 2300/80; F05D 2300/614
See application file for complete search history.

(56) References Cited

U.S. PATENT DOCUMENTS 5,723,078 A * 3/1998 Nagaraj .................... C23C 4/02
427/140
7,842,335 B2 11/2010 Skoog et al.
(Continued)

FOREIGN PATENT DOCUMENTS

| CN | 108754495 | 11/2018 |
| EP | 2236648 | 10/2010 |

OTHER PUBLICATIONS

Wang, H., Zhang, X., Wang, N., Li, Y., Feng, X., Huang, Y., and Zhao, C. et al. (2017). Ultralight, scalable, and high-temperature-resilient ceramic nanofiber sponges. Science Advances. Issue 3. Jun. 2, 2017.

(Continued)

*Primary Examiner* — Laura A Auer
(74) *Attorney, Agent, or Firm* — Carlson, Gaskey & Olds, P.C.

(57) ABSTRACT

A repair process for an article such as an airfoil includes providing an article that has a substrate and a ceramic barrier coating disposed on the substrate, where the ceramic barrier coating has a damaged region, abrading the damaged region to provide dimple in the ceramic barrier coating, wherein a remaining region of the ceramic barrier coating adjacent the dimple remains intact, and depositing a patch of networked ceramic nanofibers in the dimple.

7 Claims, 3 Drawing Sheets

(56) References Cited

U.S. PATENT DOCUMENTS 8,221,825 B2     7/2012   Reitz et al.
8,821,116 B2     9/2014   Duval

OTHER PUBLICATIONS

European Search Report for European Patent Application No. 20156401.0 completed May 13, 2020.
Azad, A-M. (2005). Fabrication of yttria-stabilized zirconia nanofibers by electrospinning. Materials Letters 60. 2006. pp. 67-72.
Wikipedia. (2018). Airfoil. Retrieved from: https://web.archive.org/web/20180818192943/https://en.wikipedia.org/wiki/Airfoil.
Wikipedia. (2017). Dry-ice blasting. Retrieved from: https://web.archive.org/web/20170202051304/https://en.wikipedia.org/wiki/Dry-ice_blasting.
Airbrasive (2018). What is microblasting machining? Retrieved from: http://www.airbrasive.com/faq/what-is-micro-blasting/.
Daristotle, J.L., Behrens, A.M., Sandler, A.D., and Kofinas, P. (2016). A review of the fundamental principles and applications of solution blow spinning. ACS Applied Materials Interfaces 2016. vol. 8. pp. 34951-34963.
Technical Sheet. Zirconia cloth type ZYK-15. Zircar. Jan. 2004.

\* cited by examiner

REPAIR PROCESS USING NETWORKED CERAMIC NANOFIBERS

CROSS-REFERENCE TO RELATED APPLICATION

The present disclosure is a divisional application of U.S. patent application Ser. No. 16/270,660 filed Feb. 8, 2019.

BACKGROUND

Gas turbine engine components in the core gaspath may be subject to temperatures in excess of the melting temperature of the component substrate. Cooling features and barrier coatings are used to protect the substrate from these extreme temperatures. Barrier coatings are typically formed of ceramic materials, such as yttria stabilized zirconia or gadolinium zirconate. A thermally grown oxide layer is provided on the substrate as a bond coat to enhance bonding of the barrier layer on the substrate.

SUMMARY

A repair process according to an example of the present disclosure includes providing an article that has a substrate and a ceramic barrier coating disposed on the substrate. The ceramic barrier coating has a damaged region, and the damaged region is abraded to provide a dimple in the ceramic barrier coating. A remaining region of the ceramic barrier coating adjacent the dimple remains intact. A patch of networked ceramic nanofibers is then deposited in the dimple.

In a further embodiment of any of the foregoing embodiments, the ceramic barrier coating has a porous columnar microstructure and the networked ceramic nanofibers extend into pores of the porous columnar microstructure in the dimple.

In a further embodiment of any of the foregoing embodiments, the abrading includes spraying the damaged region with an abrasive media.

In a further embodiment of any of the foregoing embodiments, the abrasive media includes dry ice.

In a further embodiment of any of the foregoing embodiments, the damaged region is a spalled or worn region.

In a further embodiment of any of the foregoing embodiments, the depositing includes blow-spinning and sintering.

In a further embodiment of any of the foregoing embodiments, the sintering includes heating using an energy beam.

A further embodiment of any of the foregoing embodiments includes polishing the patch to be flat with the remaining region of the ceramic barrier coating adjacent the patch.

In a further embodiment of any of the foregoing embodiments, the ceramic nanofibers include zirconium oxide.

In a further embodiment of any of the foregoing embodiments, the ceramic nanofibers are selected from the group consisting of yttria stabilized zirconia, gadolinia zirconate, and combinations thereof, and the ceramic barrier coating is selected from the group consisting of yttria stabilized zirconia, gadolinia zirconate, and combinations thereof.

In a further embodiment of any of the foregoing embodiments, the ceramic barrier coating has a thickness t1 taken at the remaining portion adjacent the damaged region, and the patch has a thickness t2 that is less than the thickness t1.

A repair process according to an example of the present disclosure includes providing an airfoil that has a substrate and a ceramic barrier coating disposed on the substrate. The ceramic barrier coating has a damaged region, and the damaged region is abraded to provide a dimple in the ceramic barrier coating. A remaining region of the ceramic barrier coating adjacent the dimple remains intact. A patch of networked ceramic nanofibers is then deposited in the dimple.

In a further embodiment of any of the foregoing embodiments, the adbrading includes spraying the damaged region with an abrasive media.

In a further embodiment of any of the foregoing embodiments, the abrasive media includes dry ice.

In a further embodiment of any of the foregoing embodiments, the damaged region is a spalled or worn region.

In a further embodiment of any of the foregoing embodiments, the depositing includes blow-spinning and sintering.

In a further embodiment of any of the foregoing embodiments, the sintering includes heating using an energy beam.

A further embodiment of any of the foregoing embodiments includes polishing the patch to be flat with the remaining region of the ceramic barrier coating adjacent the patch.

An article according to an example of the present disclosure includes a substrate and a ceramic barrier coating disposed on the substrate. The ceramic barrier coating includes a dimple, and there is a patch of networked ceramic nanofibers disposed in the dimple.

In a further embodiment of any of the foregoing embodiments, the ceramic nanofibers are selected from the group consisting of yttria stabilized zirconia, gadolinia zirconate, and combinations thereof, and the ceramic barrier coating is selected from the group consisting of yttria stabilized zirconia, gadolinia zirconate, and combinations thereof.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
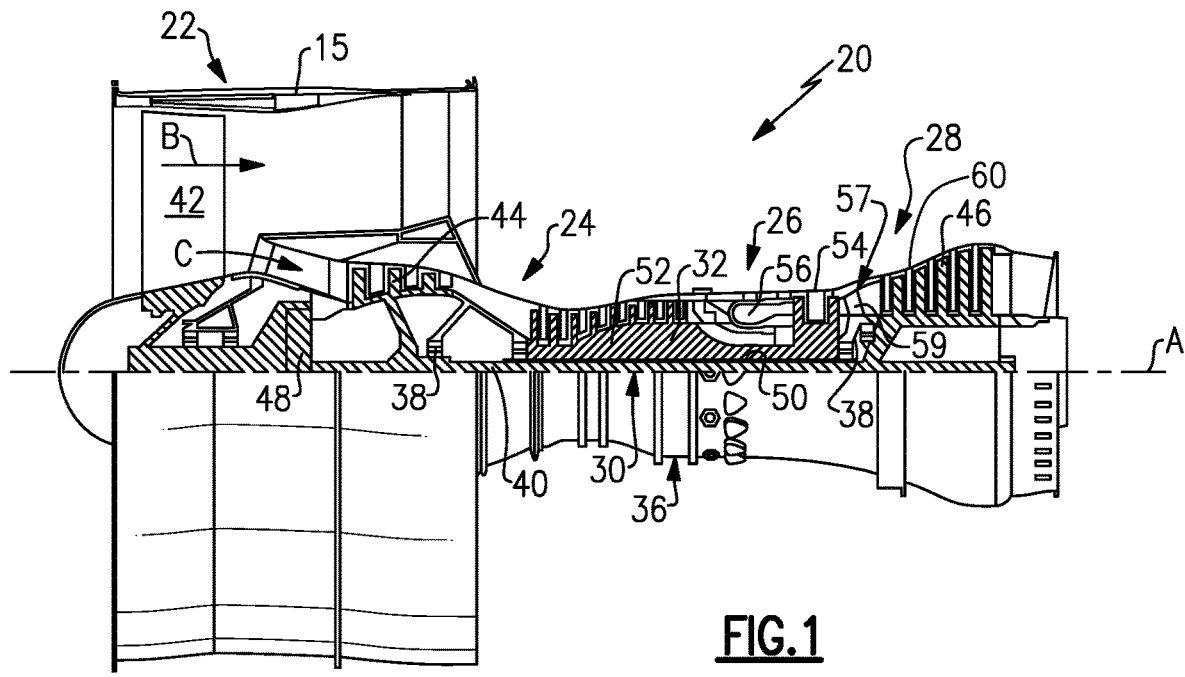
FIG. 1 illustrates an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram ° R)/(518.7° R)]^0.5. The "Low corrected fan tip speed" as disclosed herein according to one non-limiting embodiment is less than about 1150 ft/second (350.5 meters/second).

Figure 2:
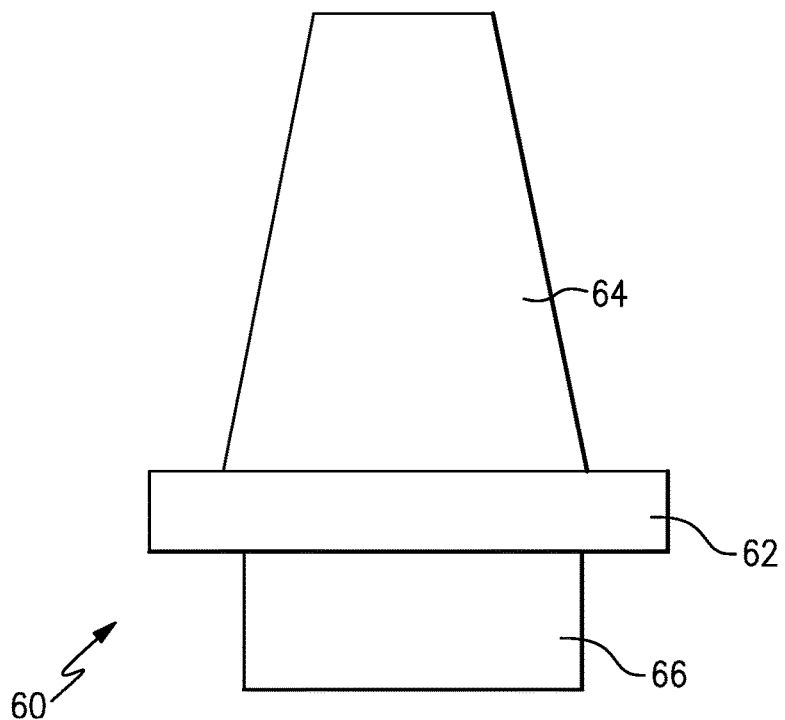
FIG. 2 illustrates an example article subject to repair.

FIG. 2 illustrates an example article 60. In this example, the article 60 is a rotatable turbine blade of the engine 20 (see also FIG. 1). It is to be understood that, although the examples herein may be described with reference to the turbine blade, this disclosure is also applicable to static turbine vanes, other types of airfoils, seals, combustors, or other gas turbine engine components.

The turbine blade generally includes a platform 62, an airfoil section 64 that extends from the platform 62, and a root 66. The article 60 is subjected during use to extreme temperatures in the engine 20. The article 60 includes a coating system to protect against the high temperatures and environmental effects that might otherwise damage the article 60. The coating system may include a ceramic barrier coating. Such ceramic barrier coatings can be subject to damage during use, such as damage from spalling, erosion, or wear. From time to time and inasmuch as feasible, such articles are repaired in order to extend use.

Figure 3:
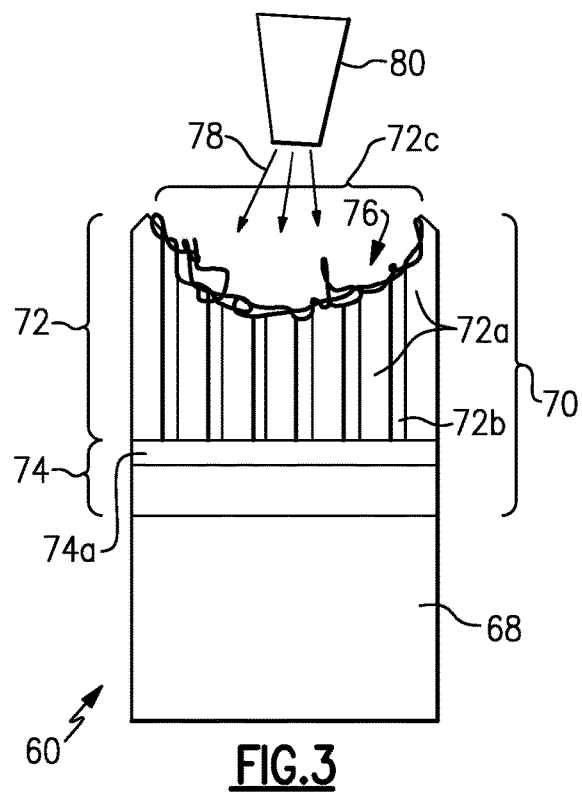
FIG. 3 illustrates a view of a representative portion of the article of FIG. 2 during a repair process involving abrading the article.
Figure 4:
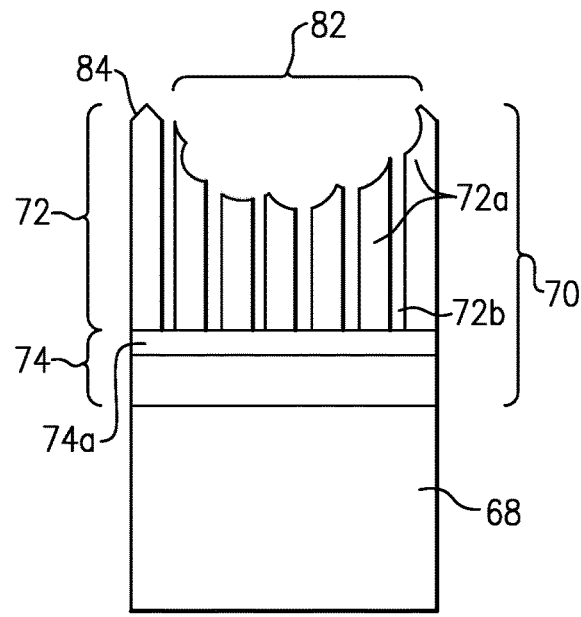
FIG. 4 illustrates the article of FIG. 3 during the repair process after abrading the article.
Figure 5:
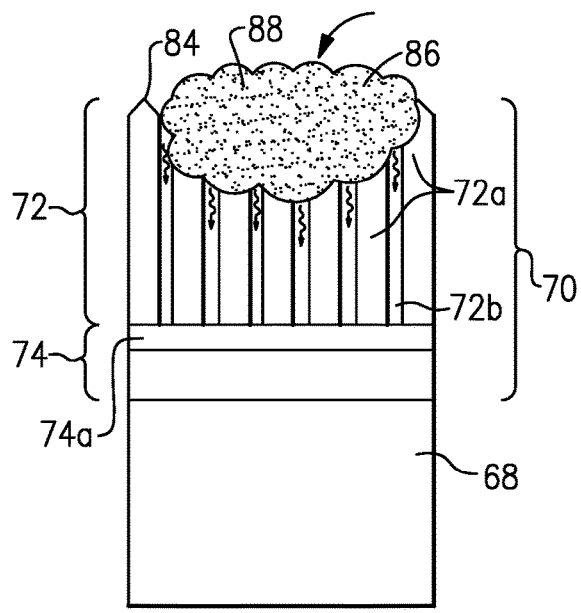
FIG. 5 illustrates the article of FIG. 4 during the repair process involving deposition of a patch of networked ceramic nanofibers.

FIGS. 3, 4, and 5 depict an example repair process for a representative portion of the article 60. For a turbine blade, the portion may be on the platform 62, airfoil section 64, or root 66. As will also be appreciated, the article 60 may have numerous portions which are repaired in a similar manner as described below.

The article 60 is formed of a substrate 68 and a coating system 70. Most typically, the substrate 68 will be formed of a superalloy, such as a nickel- or cobalt-based alloy. Alternatively, the substrate 68 may be formed of a ceramic or ceramic composite material.

The coating system 70 includes a ceramic barrier coating 72 disposed on the substrate 68. An optional bond coat 74 that has a thermally grown oxide region 74a is disposed between the ceramic barrier coating 72 and the substrate 68. The bond coat 74 may be MCrAlY, where M is nickel, iron or cobalt, Cr is chromium, Al is aluminum, and Y is yttrium. A portion of the bond coat 74 may oxidize to form the thermally grown oxide region 74a, which facilitates bonding of the ceramic barrier coating 72.

As an example, the ceramic barrier coating 72 is formed primarily of zirconium oxide. For instance, the zirconium oxide may be a stabilized or partially stabilized zirconia, such as yttrium stabilized zirconia or gadolinia stabilized zirconia, or a zirconate that is doped with a rare earth stabilizer, such as yttria or gadolinia. The ceramic barrier coating 72 may, for example, be deposited by plasma spray or physical vapor deposition, which generally result in a porous structure.

In the illustrated example, the ceramic barrier coating 72 has a columnar microstructure, represented schematically by microstructural columns 72a. Such a columnar microstructure is a result of fabrication by electron beam physical vapor deposition. The columns 72a are substantially perpendicular to the bond coat 74 and substrate 68. There are pores 72b defined by the gaps between the columns 72a. Such a columnar microstructure facilitates coating durability.

The repair process begins with the providing of the article 60 for repair, where the ceramic barrier coating 72 has a damaged region 72c. The "providing" may include identifying that the article 60 is in need of repair. In this regard, known inspection techniques may be used to detect and assess damage. More typically however, the article for repair will have already been identified and the "providing" may refer to the selection of the article to begin the repair process.

The damaged region 72c may be a region of the ceramic barrier coating 72 which has a physical deformity or imperfection, especially to a point that is unacceptable for the given article 60. Most typically, the damaged region 72c will be the result of physical phenomena that are incurred during use of the article 60 in its intended operating environment. As an example, the phenomena may be related to thermal-mechanical stresses that cause spallation, impact events that cause erosion, rubbing events that cause wear, or combinations of these. In these regards, the physical deformity may be a spalled, eroded, and/or worn portion of the ceramic barrier coating 72. Alternatively, damage may be incurred prior to use or outside of use, such as during handling and transport of the article 60. In the illustrated example, the physical deformity is a depression 76 in the ceramic barrier coating 72. In another alternative, the physical deformity may be an imperfection, such as a crack or void, that results from original fabrication of the ceramic barrier coating 72. For instance, a fabrication imperfection that renders the article 60 unacceptable for its intended use may be repaired using the disclosed repair process to render the article acceptable for its intended use.

The next step in the repair process includes abrading the damaged region 72c. The depression 76 may contain debris or other undesirable substances which could be detrimental to the ceramic barrier coating 72 or hinder the remainder of the repair process. In this respect, the abrading facilitates removal of much or all of the debris, as well as possibly small portions of the ceramic barrier coating 72 in the vicinity of the damaged region 72c. The abrading thereby produces a fresh, clean surface in the ceramic barrier coating 72.

As an example, the abrading may include spraying an abrasive media 78 from a spray nozzle 80 onto the damaged region 72c. For instance, the abrasive media 78 may be carried in a pressurized process gas. The abrasive media 78 strikes the damaged region 72c and thereby removes the debris and possibly portion of the ceramic barrier coating 72. The pressure of the process gas may be controlled in order to control removal of the debris and ceramic barrier coating 72. In one example, the abrasive media 78 includes particles of dry ice, which is solid carbon dioxide. The dry ice facilitates clean removal because it is substantially non-reactive at normal pressure and temperature (NTP) with the ceramic barrier coating 72 and thus does not leave residue or stains. Additionally, the dry ice rapidly evaporates and thus does not leave a mess.

FIG. 4 depicts the article 60 after the abrading. The abrading has removed debris and a portion of the ceramic barrier coating 72 such that a dimple 82 remains in the ceramic barrier coating 72. A remaining region of the ceramic barrier coating, a representative portion of which is shown at 84, adjacent the dimple 82 remains intact after the abrading step. For instance, "intact" may refer to this region as being unchanged in physical character before and after the abrading. In this example, the dimple 82 is only modestly larger than the damaged region 72c and does not extend entirely through the thickness of the ceramic barrier coating 72.

Figure 6:
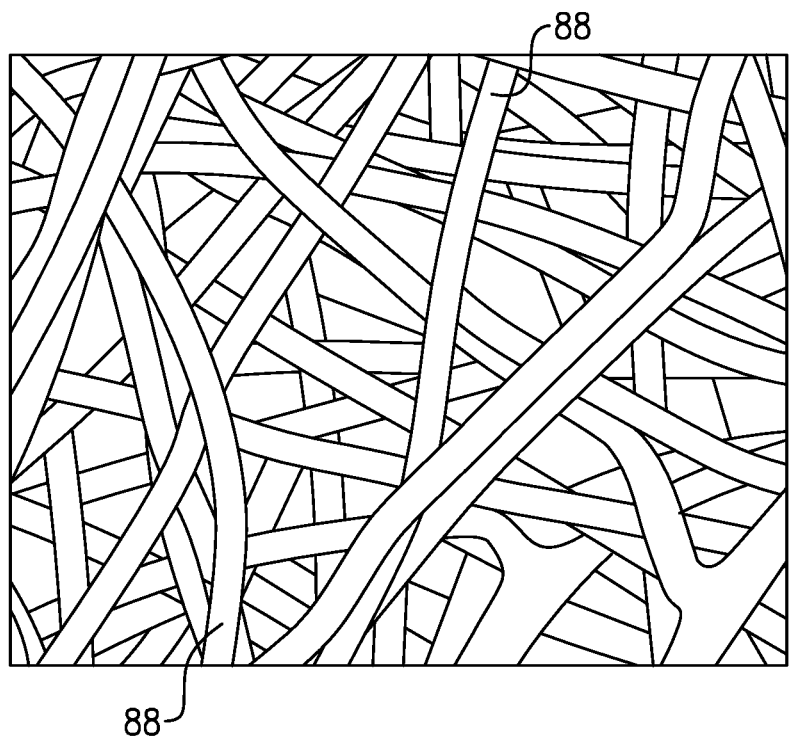
FIG. 6 illustrates a magnified view of networked ceramic nanofibers.

The next step in the repair process, depicted in FIG. 5, is the deposition of a patch 86 into the dimple 82. The patch 86 is composed of networked ceramic nanofibers 88. FIG. 6 illustrates a magnified view of the networked ceramic nanofibers 88. The nanofibers 88 are elongated, randomly oriented filaments that have a maximum diameter of 1 nanometer to 500 nanometers. More typically, the diameter will be 1 nanometer to 250 nanometers, 1 nanometer to 100 nanometers, or 1 nanometer to 50 nanometers. The filaments are non-linear and curve or turn such that the filaments are intertwined to form a tangled porous network. As used herein, "networked" refers to the intertwining of the fibers or filaments. Where the filaments contact each other, they may be bonded together as a result of the process used to form the patch 86.

The nanofibers 88 are formed of a ceramic, such as an oxide. In one example, the ceramic is zirconium oxide. For instance, the zirconium oxide may be a stabilized or partially stabilized zirconia, such as yttrium stabilized zirconia or gadolinia stabilized zirconia, or a zirconate that is doped with a rare earth stabilizer, such as yttria or gadolinia.

The patch 86 of networked ceramic nanofibers 88 fills the dimple 82 and seals the pores 72b of the ceramic barrier coating 72. The nanofibers 88 may also mechanically interlock with the surface roughness in the dimple 82 that results from the abrading, thereby providing good bonding between the patch 86 and the ceramic barrier coating 72. In that regard, the pressure of the process gas may also be controlled to produce a desirable level of roughness for mechanical interaction with the nanofibers 88.

The pores 72b in the ceramic barrier coating 72 may be prone to infiltration of debris and other material during use of the article 60 that could damage the ceramic barrier coating 72, bond coat 74, or underlying substrate 68. In particular, since the pores 72b are also substantially perpendicular to the bond coat 74 and substrate 68, they can provide a direct path of infiltration for CMAS (calcium-magnesium-aluminosilicate) and foreign material. In this regard, the networked ceramic nanofibers 88 seal the pores 72b in the dimple 82. As an example, the networked ceramic nanofibers 88 may infiltrate partially into the pores 72b during deposition, thereby enhancing sealing.

Although the patch 86 of networked ceramic nanofibers 88 is itself porous, the networked ceramic nanofibers 88 provide a sponge-like structure of smaller pores that provides superior thermal insulation. Therefore, the patch 86 of networked ceramic nanofibers 88, even if formed of the same composition as the ceramic barrier coating 72, provides thermal sealing of the ceramic barrier coating 72. As an example based on zirconia, the patch 86 of networked ceramic nanofibers 88 may have a thermal conductivity of approximately 0.027 Watts per meter-Kelvin.

Additionally, the filaments of the networked ceramic nanofibers 88 are also flexible and strain tolerant. The flexibility of the filaments may further facilitate entrapment of foreign particles, debris, or materials, as well as act as "bumper" to absorb impact of particles and debris. The patch 86 of networked ceramic nanofibers 88 thereby provides thermal and physical sealing/protection.

It is further noted that networked ceramic nanofibers are not known for being produced on barrier coatings as a patch. Rather, networked ceramic nanofibers have been produced in a screen-like cage structure. As a result, use of a patch of networked ceramic nanofibers has not been suggested in combination with a ceramic barrier coating, nor have the thermal and physical sealing benefits of a patch of ceramic nanofibers been realized for protection with a ceramic barrier coating.

The patch 86 of networked ceramic nanofibers 88 may be deposited directly into the dimple 82. For example, the patch 76 of networked ceramic nanofibers 88 may be deposited by a blow-spinning process. Blow-spinning involves spraying a precursor solution through an inner nozzle while flowing a process gas from an outer concentric nozzle such that the precursor when sprayed elongates into ultra-thin filaments. The filaments deposit in the dimple 82 and, after further processing, are converted into the ceramic nanofibers. The precursor solution includes binders and salts of the constituents that will form the ceramic, such as zirconium, oxygen, and any dopants. An example binder includes polyvinylpyrrolidone, and example salts may include aqueous oxynitrate, nitrate, nitrite, or chloride salts of zirconium and the selected dopants, zirconyl chloride, or metal organics such as zirconium isobutoxide or isopropoxide in a solvent. The amounts of the constituents may be controlled in order to control the final composition of the ceramic nanofibers. After spinning, the filaments are then thermally treated to remove binders, etc. and sinter the ceramic. The thermal treatment may include heating the filaments to temperatures from 800° C. to 1000° C., for example. It is during the thermal treatment that the filaments may diffuse and thereby bond together where they are in contact. The thermal treatment may also cause diffusion at points of contact between the nanofibers 88 and the ceramic barrier coating 72, thereby providing additional bonding.

In one further example, the thermal treatment may be conducted using an energy beam, such as a laser. In particular, the energy beam can be aimed to impinge on the patch 86, with minimal or no impingement on the remaining regions 84 of the ceramic barrier coating 72 adjacent the patch 86. The effects of the heating can thus be confined to the patch 86, while avoiding the expenditure of time and energy to heat the entire article 60.

Figure 7:
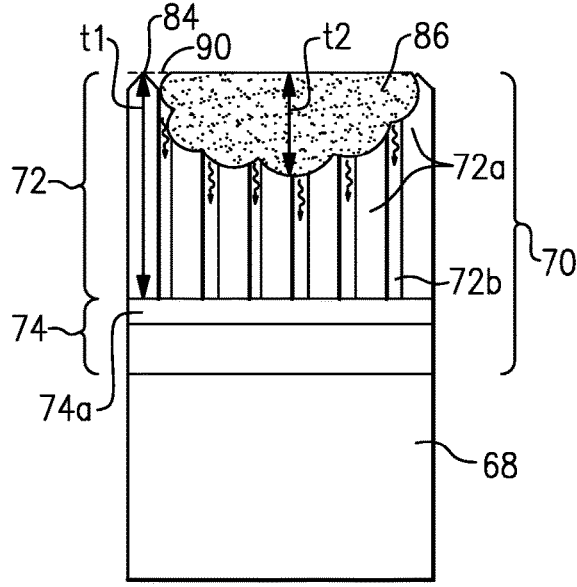
FIG. 7 illustrates the article of FIG. 5 during the repair process involving polishing the patch of networked ceramic nanofibers.

After deposition, the patch 86 may project from the ceramic barrier coating 72, which generally has a continuous, smooth outer surface. If desired, as depicted in FIG. 7, the patch 86 can be polished such that it is flush with the remaining region 84 of the ceramic barrier coating 72 adjacent the patch 86, as represented at 90.

At the remaining region 84, the ceramic barrier coating 72 may define a thickness t1. The patch 86 may also define a maximum thickness t2, wherein the thickness t2 is less than the thickness t1. The thickness t2 being less than the thickness t1 is a representation that the patch 86 is not as thick as the ceramic barrier coating 72. That is, the patch 86 most typically will be a relatively small piece of material that mends a relatively small region of the coating 72. In particular, the ceramic barrier coating 72 thus has a locally thin portion at the dimple 82. This locally thin portion, but for the patch 86, may otherwise be prone to CMAS or foreign substance infiltration.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. An article comprising:
   a substrate;
   a ceramic barrier coating disposed on the substrate, the ceramic barrier coating including a dimple, the ceramic barrier coating having a porous columnar microstructure that includes microstructural columns that define elongated pores there between; and
   a patch of networked ceramic nanofibers disposed in the dimple, the networked ceramic nanofibers comprising filaments that are non-linear and intertwined so as to form a porous network, the filaments being bonded together at locations where the filaments contact each other, and wherein the networked ceramic nanofibers extend into the elongated pores and interlock with the elongated pores and surface roughness of the dimple such that the networked ceramic nanofibers are secured to the ceramic barrier coating.

2. The article as recited in claim 1, wherein the ceramic nanofibers are selected from the group consisting of yttria stabilized zirconia, gadolinia zirconate, and combinations thereof.

3. The article as recited in claim 1, wherein the ceramic barrier coating is selected from the group consisting of yttria stabilized zirconia, gadolinia zirconate, and combinations thereof.

4. The article as recited in claim 1, wherein the ceramic nanofibers are selected from the group consisting of yttria stabilized zirconia, gadolinia zirconate, and combinations thereof, and the ceramic barrier coating is selected from the group consisting of yttria stabilized zirconia, gadolinia zirconate, and combinations thereof.

5. The article as recited in claim 1, wherein the ceramic nanofibers include zirconium oxide.

6. The article as recited in claim 1, wherein the filaments are flexible.

7. The article as in claim 1, wherein the substrate is an airfoil.

* * * * *